United States Patent Office 3,303,189
Patented Feb. 7, 1967

3,303,189
2,1-BENZOTHIAZINE-2,2-DIOXIDES
Bernard Loev, Broomall, Pa., assignor to Smith Kline & French Laboratories, Philadelphia, Pa., a corporation of Pennsylvania
No Drawing. Filed Mar. 11, 1965, Ser. No. 439,098
12 Claims. (Cl. 260—243)

This invention relates to a new series of hetero-cyclic compounds characterized by having a sulfostyril or 2,1-benzothiazine-2,2-dioxide nucleus. These compounds have utility as intermediates for preparing biologically active compounds and also have pharmacodynamic activity in their own right, such as CNS depressant, hypotensive and antidiabetic activity. This invention also covers novel methods for preparing these new compounds.

The nucleus of the new compounds of this invention is designated by Chemical Abstracts terminology as 2,1-benzothiazine-2,2-dioxide. The coined name for this structure used in the description and examples herein is "sulfostyril" which name is used for sake of simplicity. See B. Loev and M. F. Kormendy, J. Org. Chem. 30, 3163 (1965) and copending Serial No. 439,099 filed March 11, 1965.

The compounds of this invention are illustrated by the following structure:

Formula I in which:
R represents hydrogen, lower alkyl, phenyl, lower alkonyl or (dialkyl)aminoalkyl;
$R_1$ represent hydrogen, lower alkyl or phenyl;
$R_2$ and $R_3$ represent hydrogen, halo such as fluoro, bromo or chloro, nitro, amino, sulfonamido, trifluoromethyl, lower alkyl, lower alkoxy or lower alkyl thio; and
$R_4$ represent lower alkyl, hydroxy or hydrogen.

The compounds of this invention are prepared by decomposing a hydrazone of a 4-keto-3,4-dihydrosulfostyril which compounds are described in a copending application Serial No. 439,101 filed March 11, 1965, or by cyclization of an acyl methane-sulfonanilide. The former is accomplished by reacting the hydrazone in the presence of a base, such as an alkali metal lower alkoxide, in a suitable solvent such as methanol, ethanol, ethylene glycol, tert.-butanol or aqueous mixtures thereof. The reaction most conveniently is carried out at temperatures of about 70 to 220° C. for from about 1–24 hours. Sodium or potassium methoxide or ethoxide are the preferred alkaline adjuvants. The reaction is represented by the following formula:

in which:
R, $R_1$, $R_2$ and $R_3$ are as hereabove defined; and
$R_4$ is lower alkylsulfonyl, phenylsulfonyl or substituted phenylsulfonyl such as the preferred p-tosyl.

Other hydrazones give little additional advantages over these.

The cyclization procedure for preparing these compounds is as follows:

in which R–$R_4$ are as hereabove defined.

The preferred compound of Formula I are the N-dialkylaminoalkylsulfostyrils for example those of the structure:

Formula II in which:
$R_1$–$R_3$ are as described;
alk is a straight or branched alkylene chain of from 2–6 carbon atoms inclusive separating N and A by at least 2 carbon atoms; and
A is dilower alkylamino, lower alkylamino, amino or a basic saturated heterocyclic N-containing end group such as N-pyrrolidinyl, N-N'-loweralkylpiperazinyl, N-piperazinyl, N-piperidinyl, C-N-methylpiperidinyl, C-N-methylpyrrolidinyl, N-morpholinyl or N-thiomorpholinyl (said A groups are referred to herein as "dialkylamino").

The N-dialkylaminoalkylsulfostyrils of Formula II are preferred because of their pronounced hypotensive, depressant and hypoglycemic activities.

Also included in this invention are nontoxic salts of the basic compounds of Formulas I and II with pharmaceutically acceptable acids such as hydrochloric, sulfuric, phosphoric sulfamic, maleic, ethane disulfonic, or pamoic acids or with standard quaternizing compounds known to the art such as lower alkyl iodides, bromides or chlorides and a lower alkyl sulfate, or a lower alkyl toluene sulfonate. Such salt derivaties are prepared by methods well known to the art such as reaction of the base with an excess of the acid or quaternizing agent in an organic solvent such as ether, ethyl acetate, benzene, tetrahydrofuran or toluene.

The parent sulfostyrils (Formula I in which R is hydrogen) also form metallic salts with alkali metals such as by reaction with an alkali metal lower alkoxide in benzene or dimethylformamide or with an alkali metal hydroxide in water. Such nontoxic salts especially the sodium or potassium salts are also a part of this invention.

The N-dialkylaminoalkylsulfostyrils of Formula II are prepared by reaction of the chosen dialkylaminoalkyl reactive ester such as the chloride, bromide, iodide or tosylate with the sulfostyril in the presence of a strong acid binding agent such as an alkali metal hydride such as sodium or potassium hydride or alkali metal alcoholate, such as sodium methoxide in an inert solvent such as dimethylsulfoxide or benzene or mixtures of such solvents. The reaction is usually carried out with heating such as at reflux for long periods of time, i.e., 12–36 hours. Alternatively the alkali metal salt may be reacted with the ester in aqueous solution, although this usually gives poorer results.

The compounds of Formula II in which A is amino, monoalkylamino, piperazinyl, etc. are prepared; by reacting the parent sulfostyril with acrylonitrile then reducing the cyano radical to the primary amine using zinc and sulfuric acid or lithium aluminum hydride; by reaction with a ω-haloalkanol to form an N-(ω-hydroxyalkyl)-sulfostyril which is then either converted to the tosylate with tosyl chloride or to the reactive halide with thionyl halide, the tosylate or halide then being reacted with the desired primary or secondary amine (or sodium cyanide) or by N-alkylating with a ω-haloalkylamide followed by hydrolysis or reduction of the amide function.

These intermediate compounds also are an important part of this invention and are exemplified as follows:

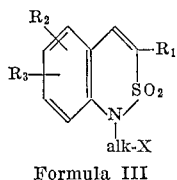

Formula III in which:

$R_1$–$R_3$ and alk are as described hereabove and

X is cyano, hydroxyl, chloro, tosyloxy or lower alkanoylamino.

The N-loweralkyl or N-phenyl sulfostyrils of Formula I are prepared conveniently by N-alkylation using sodium hydride and an alkyl halide, diloweralkylsulfate and sodium methoxide, diphenyliodonium iodide or an active aryl halide using a copper catalyst. Such reactions are outlined in detail in the examples.

It has also been found that N-chloro and N-bromo amides especially the succinimides halogenate the benzene portion of the sulfostyril nucleus. In certain cases reaction at the 3,4-position also takes place. The sulfostyrils of this invention are acylated by refluxing with an acid anhydride such as acetic anhydride or by reaction of the alkali metal salt with an acid halide such as benzoyl chloride. Other direct nuclear reactions in the benzo ring can also be carried out using standard nucleophilic reaction conditions such as nitration or chlorosulfonation at the 6 or 6,8-position as described in copending application Serial No. 439,099, filed March 11, 1965, which covers the dihydrosulfostyril series. The nitro substituents can be reduced using chemical reducing agents as described to the amines which are then diazotized for conversion to halo, hydroxy, methoxy, ethoxy, etc. derivatives. The chlorosulfonyl substituted compounds can be reacted with ammonia to give the sulfamyl compounds.

The sulfostyril compounds of Formula I are useful intermediates for preparing the corresponding useful 3,4-dihydrosulfostyrils which are claimed in copending application Serial No. 439,101, filed March 11, 1965. The 3,4-dihydrosulfostyrils are prepared from the sulfostyrils of Formula I by using preferably catalytic methods such as hydrogenation at atmospheric or superatmospheric pressures, using palladium, platinum, nickel, or other catalysts in a solvent such as water, dilute bases, alcohol, acetic acid, etc.

Other variations of this invention will be apparent to those skilled in this art, for example, the phenyl group at position 1 or in the hydrazone moiety can be optionally substituted by an inert group or replaced by a thienyl. It will be obvious that other reagents or conditions can be employed in the processes described. The term "lower" used in conjunction with a hydrocarbon chain containing moiety such as alkyl, acyl, alkoxide, alkoxy, etc. connotes containing from 1–8 carbon atoms but preferably 1–2 carbons in the hydrocarbon chain.

The following examples are designed to illustrate this reaction in order to make its practice apparent to those skilled in the art.

EXAMPLE 1

The p-toluenesulfonylhydrazone of 4-keto-3,4-dihydrosulfostyril (Serial No. 439,101, filed March 11, 1965) (85 g.) is dissolved in 1.7 l. of hot ethanol then 39.4 g. of sodium methoxide is added. Water is added to dissolve the separated solid and the mixture is heated at reflux for 18 hours. The solution is concentrated to a small volume, diluted with water and made acid to separate a solid which is extracted with boiling water twice. Cooling separates sulfostyril, M.P. 153–155° C. from chloroform.

EXAMPLE 2

Sodium hydride (0.018 mole, 0.8 g. of a 55% dispersion in mineral oil) is added to a solution of 3.0 g. (0.0166 mole) of sulfostyril in 50 ml. of dry dimethylsulfoxide. When the evolution of hydrogen gas ceases, a solution of 0.041 mole of dimethylaminoethyl chloride in benzene is added. The mixture is heated on the steam bath for 18 hours. The solvent is removed in vacuo. Water is added to the residue. Extraction with ether gives a brown oily base. This oil is dissolved in ether and converted with hydrogen chloride gas to the hydrochloride salt of N-dimethylaminoethylsulfostyril, M.P. 237.5–241° C. from alcohol-water.

A portion of the oily base (500 mg.) is reacted in ether with ethyl iodide to give the quaternary ethiodide salt.

EXAMPLE 3

Using the procedure of Example 2 and 4.0 g. of sulfostyril, 1.1 g. of sodium hydride and 6.5 g. of 3-dimethylaminopropyl chloride gives N-3-dimethylaminopropylsulfostyril hydrochloride from the oily base, M.P. 158–160° C. from ethanol.

EXAMPLE 4

The tosylhydrazone of 8-methoxy-4-keto-3,4-dihydrosulfostyril (2 g.) is reacted with 1 g. of potassium ethoxide in aqueous ethanol with refluxing for 16 hours to give 8-methoxysulfostyril.

Similarly the tosylhydrazone of 3,6-dimethyl-4-keto-3,4-dihydrosulfostyril is reacted with alcoholic sodium methoxide to give 3,6-dimethylsulfostyril. The tosylhydrazone of 5-methyl-8-chloro-4-keto-3,4-dihydrosulfostyril gives 5-methyl-8-chlorosulfostyril. The tosylhydrazone of 7-trifluoromethyl-4-keto-3,4-dihydrosulfostyril gives 7-trifluoromethylsulfostyril.

EXAMPLE 5

A mixture of 6 g. of sulfostyril, 3.5 g. of acetic anhydride, 10 g. of triethyl amine in 100 ml. of tetrahydrofuran is refluxed for three hours. The solvent is removed in vacuo. The residual oil crystallizes with stirring with a little water. It is recrystallized from alcohol-water to give N-acetylsulfostyril.

EXAMPLE 6

A solution of 10 g. of acetylmethanesulfonyl chloride, prepared by treating potassium acetonesulfonate with phosphorus trichloride in benzene is added slowly with cooling to a benzene solution containing one molar equivalent of aniline. After stirring for 18 hours, the salt is filtered off and the solvent removed in vacuo. The sulfonamide, without purification, is stirred for five minutes with 100 g. of polyphosphoric acid at 120–150° C. then poured over ice. The product separates and is recrystallized from alcohol-water, M.P. 80–85° C., 4-methylsulfostyril.

EXAMPLE 7

Sodium methoxide (1.05 g.) is added to a solution of 3.5 g. of sulfostyril in 15 ml. of dimethylformamide. Dimethylsulfate (6 ml.) is added followed by a reflux period of two hours. The solvent is removed in vacuo and the residue stirred with water to separate N-methylsulfostyril, M.P. 69.5–70° C.

EXAMPLE 8

A mixture of 34.8 g. of trimethylsulfoxonium iodide in 175 ml. of dimethylsulfoxide is treated with 6.9 g. of 53% sodium hydride in mineral oil at 15–20° C. under nitrogen. A solution of 7.7 g. of N-methylsulfostyril in dry dimethylsulfoxide is added. The mixture is heated at 60–65° C. for one hour, then left at room temperature for 18 hours. After pouring on ice, the solid which separates is extracted with hot hexane. The residue which is recrystallized from aqueous alcohol is 1,4-dimethylsulfostyril, M.P. 80–85° C.

EXAMPLE 9

A mixture of 5 g. of N-methylsulfostyril and 4.50 g. of N-bromosuccinimide in 15 ml. of dimethylformamide is heated on a steam bath for three hours then poured into ice water. The separated oil is extracted with ether; cooling crystallizes 6-bromo-N-methylsulfostyril, M.P. 102–103° C.

EXAMPLE 10

A mixture of 10 g. of sulfostyril, 20 g. of diphenyliodonium chloride, 3 g. of sodium methoxide and 0.5 g. of cuprous chloride in 200 ml. of methanol is heated at reflux for 1 hours. The filtrate therefrom is concentrated in vacuo. The residue is stirred under 10% hydroxide then extracted with methylene chloride. The organic extracts are concentrated to give N-phenylsulfostyril, M.P. 156–157° C.

EXAMPLE 11

A mixture of 10 g. of sulfostyril with equimolar amounts of sodium hydride and ethylene chlorohydrin is reacted as described to give N-β-hydroxyethylsulfostyril.

The compound (11 g.) is reacted with a slight excess of tosyl chloride in pyridine. Quenching with water gives N-β-tosyloxyethylsulfostyril.

The tosyloxy intermediate is heated briefly in 2 g. portions in dimethylsulfoxide with an excess of butylamine, piperazine and ethylamine to give upon quenching in water respectively N-butylaminoethylsulfostyril, N-piperazinylethylsulfostyril and N-ethylaminoethylsulfostyril as oils.

EXAMPLE 12

A mixture of 5 g. of sulfostyril in dimethylformamide is reacted with an excess of acrylonitrile in the presence of base for several days to give N-cyanoethylsulfostyril.

This compound (4 g.) is reduced with lithium aluminum hydride in tetrahydrafuran to give N-aminoethylsulfostyril. The base (500 g.) in dimethylsulfoxide is reacted with an excess of hydrogen bromide to give the salt.

EXAMPLE 13

A mixture of 2.5 g. of 6-trifluoromethylsulfostyril is reacted with sodium hydride and 2-(N-methylpyrrolidinyl-3)-ethyl bromide by the procedure of Example 2 to give N-(2-N-methylpyrrolidinyl-3 - ethyl)-6 - trifluoromethylsulfostyril. Using 3 g. of sulfostyril and an excess of 2-(N-methylpiperidinyl-2')-ethyl bromide with sodium hydride in the process of Example 2 gives N-(N-methylpiperidinyl-2'-ethyl)-sulfostyril.

EXAMPLE 14

N-methylsulfostyril (4.7 g.) is dissolved in alcohol and hydrogenated at room temperature and 50 p.s.i. in the presence of palladium-on-carbon catalyst. The reduction is complete in 30 minutes. The catalyst is filtered and the solvent removed in vacuo, leaving a quantitative yield of N-methyl-dihydrosulfostyril.

EXAMPLE 15

A mixture of 5 g. of sulfostyril and 9.86 g. of N-bromosuccinimide in dimethylformamide is heated on the steam bath. The resulting oil is stirred with ether. The ethereal filtrate is evaporated. The residue is chromatographed over neutral alumina using methanol. The resulting product, tribromosulfostyril, melts at 179–180° C.

EXAMPLE 16

Sulfostyril (5 g.) in 5 ml. of glacial acetic acid and 10 ml. of concentrated sulfuric acid is cooled and stirred while 4 g. of concentrated nitric acid and 2.5 g. of concentrated sulfuric acid is added. After 18 hours at room temperature the mixture is poured onto ice to give 6-nitrosulfostyril.

EXAMPLE 17

A suspension of 1 g. of 6-nitrosulfostyril and 2 g. of granulated tin in 5 ml. of ethanol is stirred while 20 ml. of 10% hydrochloric acid is added portionwise. After heating for 30 minutes on the steam bath, the mixture is cooled, diluted with water, neutralized and extracted with methylene chloride. The dried extract is evaporated to give 6-aminosulfostyril.

What is claimed is:

1. A compound of the structure:

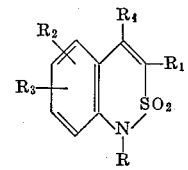

in which:

R is a member selected from the group consisting of hydrogen, lower alkyl, phenyl, lower alkanoyl and (dialkyl)aminoalkyl;

$R_1$ is a member selected from the group consisting of hydrogen, lower alkyl and phenyl;

$R_2$ and $R_3$ are members selected from the group consisting of hydrogen, halo, trifluoromethyl, lower alkyl, lower alkoxy, lower alkylthio, nitro, amino and sulfonamido; and $R_4$ is a member selected from the group consisting of hydrogen, lower alkyl and hydroxy.

2. 2,1-benzothiazine-2,2-dioxide.

3. N - (dimethylaminoethyl)-2,1-benzothiazine-2,2-dioxide hydrochloride.

4. N - (dimethylaminopropyl)-2,1-benzothiazine-2,2-dioxide.

5. 6 - trifluoromethyl-2,1-benzothiazine-2,2-dioxide.

6. N - methyl-6-bromo-2,1-benzothiazine-2,2-dioxide.

7. The method of preparing a 2,1-benzothiazine-2,2-dioxide of the structure:

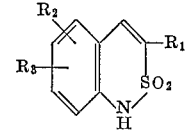

in which:

$R_1$ is a member selected from the group consisting of hydrogen, lower alkyl and phenyl; and $R_2$ and $R_3$ are members selected from the group consisting of hydrogen, halo, trifluoromethyl, lower alkyl, lower alkoxy and lower alkylthio, comprising reacting with a member selected from the group consisting of an alkali metal lower alkoxide and hydroxide a compound of the structure:

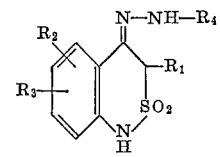

7 in which:
 R$_1$–R$_3$ are as defined above and R$_4$ is a member selected from the group consisting of phenylsulfonyl, tosyl and lower alkylsulfonyl.

8. The method of claim 7 characterized in that R$_1$–R$_3$ are hydrogen and the alkali metal alkoxide is a methoxide.

9. A compound of the structure:

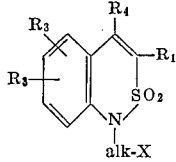

in which:
 R$_1$ is a member selected from the group consisting of hydrogen, lower alkyl and phenyl;
 R$_2$ and R$_3$ are members selected from the group consisting of hydrogen, trifluoromethyl, halo, lower alkyl, lower alkoxy, nitro and lower alkylthio;
 R$_4$ is a member selected from the group consisting of hydrogen and lower alkyl;
 alk is an alkylene chain of from 2–6 carbons; and
 X is a member selected from the group consisting of cyano, hydroxyl, chloro, tosyloxy and lower alkanoylamino.

10. The compound of the structure:

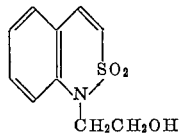

11. The compound of the structure:

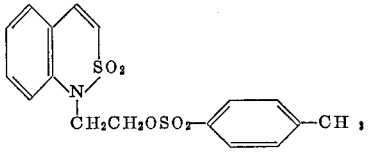

8

12. The compound of the structure:

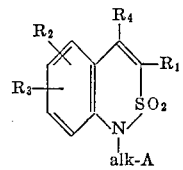

in which:

R$_1$ is a member selected from the group consisting of hydrogen, lower alkyl and phenyl;
 R$_2$ and R$_3$ are members selected from the group consisting of hydrogen, trifluoromethyl, nitro, halo, lower alkyl, lower alkoxy and lower alkylthio;
 R$_4$ is a member selected from the group consisting of hydrogen and lower alkyl;
 alk is an alkylene chain of from 2–6 carbons; and
 A is a member selected from the group consisting of diloweralkylamino, loweralkylamino, amino, piperazinyl, N-pyrrolidinyl, N-piperidinyl, N-morpholinyl, C-N-methylpiperadinyl, C-N-methylpyrrolidinyl, N-thiomorpholinyl and N-N'-loweralkylpiperazinyl.

References Cited by the Examiner

Theilheimer, "Synthetic Methods of Organic Chemistry," vol. 7, Interscience Pub., Inc., New York (1953), pages 34 to 35, Nos. 84 and 87.

Chemical Abstracts, Subject Index, January–June 1960, vol. 54, page 244s.

Chemical Abstracts, Subject Index, vol. 56, January–June 1962, page 326s.

WALTER A. MODANCE, *Primary Examiner.*

JOHN M. FORD, *Assistant Examiner.*